United States Patent

Van Wicklin, Jr.

[15] 3,636,794
[45] Jan. 25, 1972

[54] POWER STEERING SYSTEM

[72] Inventor: Warren A. Van Wicklin, Jr., Dearborn, Mich.

[73] Assignee: Ford Motor Company, Dearborn, Mich.

[22] Filed: Dec. 11, 1968

[21] Appl. No.: 782,948

[52] U.S. Cl.................................74/495, 180/79.2, 280/94
[51] Int. Cl..........................................................B62d 1/16
[58] Field of Search........................74/495; 180/79.2; 280/94

[56] References Cited

UNITED STATES PATENTS

| | | | |
|---|---|---|---|
| 1,383,348 | 7/1921 | Stanbon | 74/495 |
| 3,374,850 | 3/1968 | Cech | 74/495 X |

*Primary Examiner*—Milton Kaufman
*Attorney*—John R. Faulkner and Clifford L. Sadler

[57] ABSTRACT

A power steering system for a motor vehicle which in its presently preferred embodiment has a power steering gear, a steering wheel, and a steering shaft connecting the wheel to the steering gear. A spiral leaf spring is connected to the steering shaft and exerts a force tending to center the steering wheel and shaft.

2 Claims, 4 Drawing Figures

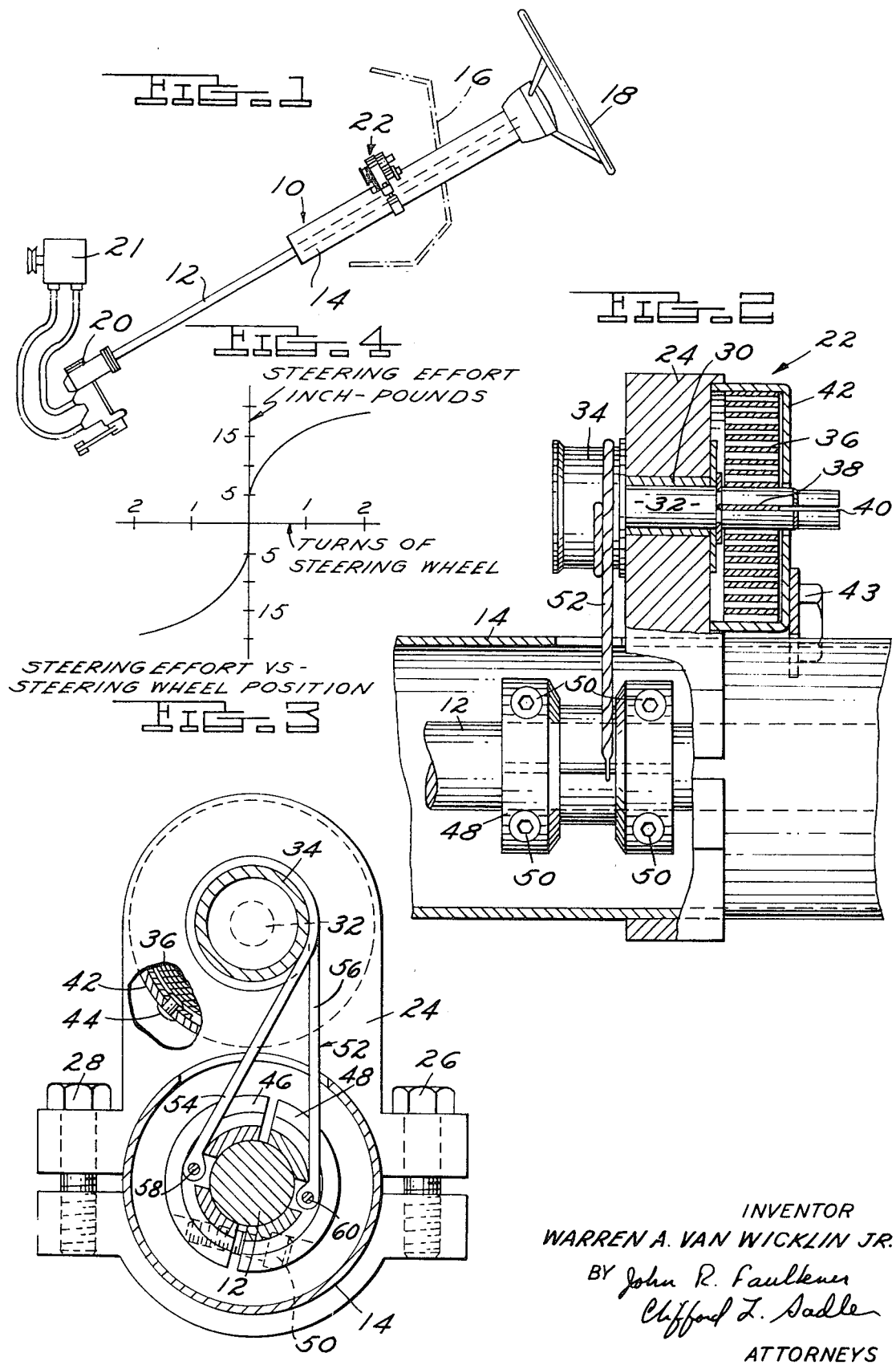

POWER STEERING SYSTEM

BACKGROUND OF THE INVENTION

Two principal types of power steering reaction, or means of providing "feel," have been used in passenger cars. Historically, the first approach was the use of hydraulic reaction. In this system a hydraulic reaction area is provided on the hydraulic servocontrol valve. The hydraulic pressure that is furnished to the power cylinder also acts upon the hydraulic reaction area, producing a reaction force proportional to the amount of power boost.

This construction provided a linear relationship between the reaction force (steering effort) and output torque. In the early period of power steering, this linear relationship was favored. The characteristics of hydraulic reaction are: 1) light steering effort for corrective steering, 2) good recovery action, 3) relatively high parking effort since the output torque at parking is about three times greater than for cornering with the steering effort correspondingly greater, and 4) a moderate amount of feedback from road disturbances to the front wheels.

As the demand for lower steering effort increased, the use of hydraulic reaction was extended by the addition of a pressure reducing valve to control the hydraulic pressure acting upon the reaction area. This valve, sometimes known as a "parking valve," provides linear reaction during corrective steering and cornering but then limits the reaction pressure as the output torque increases above that encountered in cornering. This gives the designer additional freedom in establishing the relationship between steering effort and output torque.

Another development in producing and controlling steering effort in power steering systems is torsion spring reaction, such as disclosed in U.S. Pat. No. 3,292,499 issued Dec. 20, 1966 to James J. Duffy. The metering of the control valve is designed to produce a pressure output across the power cylinder proportional to the square of the valve displacement. The deflection of the torsion spring is proportional to the steering effort. This results in the output torque being proportional to the square of the steering effort. Characteristics of torsion spring reaction are: 1) light steering effort for corrective steering, 2) fair recovery, 3) moderate parking effort, 4) low feedback from road disturbances.

In each of these two approaches, the designer is restrained by some relationship between corrective steering effort, recovery, feedback and parking effort so that he cannot control these factors independently.

BRIEF SUMMARY OF THE DISCLOSURE

In view of the state of the art the objective of this disclosure is to present a construction which provides low-steering effort, outstanding recovery and elimination of feedback. This is accomplished by imposing a spring produced centering torque upon the steering shaft and eliminating or minimizing all other reaction torques.

The presently preferred embodiment provides a spiral leaf spring that is mounted on the steering column housing and is connected to the steering shaft. The system includes a power steering gear constructed to have minimal reaction torque, i.e., it requires minimum input effort to obtain the desired output responses to effect a steering maneuver. The spiral leaf spring is constructed to provide the steering effort which the driver experiences and the torque to return the steering shaft to its center or neutral position.

Rotation of the steering shaft from the straight-ahead position causes the steering effort to increase rapidly, giving a positive center feel. Further rotation of the steering shaft, as during cornering, results in very little added steering effort since the torsional rate is reduced as the angular deflection increases. This results from the peculiar deflection versus spring rate characteristics of a spiral leaf spring. The torsional rate drops to approximately zero at one revolution of the steering shaft from the straight-ahead position so there is almost no increase in steering effort as the front wheels are turned to the limits of their travel.

BRIEF DESCRIPTION OF THE DRAWINGS

The many objects and advantages of the present invention will become apparent upon consideration of the following detailed description and the accompanying drawings in which:

FIG. 1 is a side elevational view of a portion of a power steering system incorporating the present invention;

FIG. 2 is an enlarged elevational view partly in section of the steering shaft centering device of this invention;

FIG. 3 is an end view partly section of the device of FIG. 2; and

FIG. 4 is a steering effort versus steering wheel position curve for a typical steering system incorporating the present invention.

DETAILED DESCRIPTION OF THE PREFERRED EMBODIMENT

Referring now to the drawings wherein the presently preferred embodiment of the invention is disclosed, FIG. 1 shows a portion of a power steering system for a motor vehicle. The system of FIG. 1 includes a steering column assembly 10 having a stationary steering column housing 14 that rotatably supports a steering shaft 12. An instrument panel 16 of a vehicle having this system supports the housing 14. A steering wheel 18 is connected to the upper end of the steering shaft 12 and is positioned to be rotated by the vehicle operator.

A power steering gear 20 is connected to the lower end of the shaft 12. The power steering gear 20 may be of the type illustrated in U.S. Pat. No. 3,292,499 issued to James J. Duffy on Dec. 20, 1966. The steering gear 20 constructed to be connected to the steering linkage system for the front steerable wheels of the vehicle. A power steering pump 21 is arranged to be driven by the vehicle engine. A flexible hose conveys hydraulic fluid under pressure from the pump 19 to the power steering gear 20.

A centering device 22 is supported on the steering column and is constructed to maintain the steering shaft 12, the steering wheel 18 and the steerable road wheels of the vehicle in a center or a neutral position. The device 22 includes a housing 24 that is connected to the tubular housing 14 of the steering column by means of a pair of bolts 26 and 28 as seen in FIG. 3. The housing 24 is bored to receive a bearing 30 and the bearing, in turn, rotatably supports a shaft 32.

As seen in FIG. 2, a spool 34 is secured to the left side of the shaft 32. A spiral leaf spring 36 is secured to the right-hand protruding end of the shaft 32. The inner end 38 of the leaf spring 36 is secured in a slot 40 formed in the shaft 32. The spring 36 is enclosed in a stamped housing 42 which, in turn, is secured to the housing member 24 of the assembly 22 by means of bolts 43. The outer end of the spring 36 is riveted at 44 to the housing 42.

A spool having semicylindrical parts 46 and 48 is secured to the steering shaft 12 by means of cap screws 50. A flexible cable 52 has its midportion secured to the spool 34 mounted on shaft 32. The free ends 54 and 56 of the flexible cable 52 are connected to the spool parts 46 and 48, respectively, by retaining pins 58 and 60. It will be noted from FIG. 3 that the cable 52 is secured to the spool 34 and wound about it in such a manner that both of the free ends 54 and 56 come off of the spool on the same side.

As seen in FIG. 3, the free ends 54 and 56 of the cable 52 form an angle. When the vehicle's front wheels are in a neutral straight-ahead position, the retaining pins 58 and 60 are situated relative to the shaft 12 so that the bisector of the angle formed by the free ends 54 and 56 extends through the center of the shaft 12. The shaft 12 is then centered in its neutral position.

In a power steering system having the centering device of FIGS. 2 and 3, the power steering gear 20 is constructed to have minimum reaction torque. A distinctive characteristic of this invention is that the steering effort is only a function of the steering angle and not a function of the output torque of the power steering gear 20. Therefore, the steering effort evidenced at the steering wheel by the driver is not dependent upon the type of road surface. Ice covered roads give the same positive power feel as dry pavement.

This unique construction makes it possible to realize certain economies in the construction of the control valve within the power steering gear without impairing the quality of the performance of the power steering since the valve metering characteristics no longer must be controlled to achieve the desired steering effort.

Recovery after executing a steering maneuver is independent from the self-aligning torque of the pneumatic tires. Power recovery is furnished at all times even when the vehicle is at rest. The recovery is powered recovery because the spring 36 drives the power steering gear 20 through the shaft 12. The recovery is always uniform and is unaffected by vehicle speed and attitude.

In a power steering system in accordance with this invention and having a power steering gear of the general type described in U.S. Pat. No. 3,292,499, the torsion bar of the steering gear may be reduced to have a diameter of only one-tenth of an inch. This reduces the torsional rate of the torsion bar within the steering gear to one-sixth of the normal rate. Because the rate of the torsion bar is so greatly reduced, the bar functions mainly as a column or positioning member to locate the input shaft in its proper axial position. Pretensioning of the spiral spring 36 permits adjustment of the initial steering effort rate. As the steering wheel is rotated from straight-ahead position, the retractor spring is extended. Since this spring is almost a constant force device, the steering effort versus steering wheel position relationship is established as shown in FIG. 4. In that figure, a curve for a typical installation of the present invention is illustrated.

CONCLUSION

Therefore, the present invention provides a construction having a power steering system characterized by low-steering effort, outstanding recovery and elimination of feedback. This object is accomplished by providing a spring produced centering torque to the steering shaft and eliminating or minimizing all other reactions torque. The force exerted by the spring 36 upon the shaft 12 exceeds any other reaction torque that may exist in the system.

I claim:

1. A power steering system for a motor vehicle having a power steering gear, a hydraulic pressure source connected to said gear, a steering shaft, a steering column assembly rotatably supporting said shaft, said shaft having one end connected to said steering gear and its other end connected to a steering wheel, a spring device supported on said steering column assembly, said device having rotatably mounted shaft spaced from said steering shaft, a spiral leaf spring having one end connected to said second-mentioned shaft, the other end of said spring being anchored on said steering column assembly, a spool connected to said second mentioned shaft, flexible connecting means interconnecting said spool and said steering shaft whereby when said steering shaft is rotated a spring force is transmitted from said spiral leaf spring through said flexible connecting means to said steering shaft tending to urge said steering shaft to its central neutral position.

2. A power steering system for a motor vehicle having a power steering gear, a hydraulic pressure source connected to said gear, a steering shaft, a steering column assembly rotatably supporting said shaft, said shaft having one end connected to said steering gear and its other end connected to a steering wheel, a spring device supported on aid steering column assembly, said device having a rotatably mounted shaft spaced from said steering shaft, a spiral leaf spring having one end connected to said second-mentioned shaft, the other end of said spring being anchored on said steering column assembly, a spool connected to said second-mentioned shaft, flexible connecting means interconnecting said spool and said steering shaft whereby when said steering shaft is rotated a spring force is transmitted from said spiral leaf spring through said flexible connecting means to said steering shaft tending to urge to steering shaft to its central neutral position, said spring device exerting a force on said steering shaft when said steering shaft is turned to a nonneutral position that exceeds any reaction force occurring in said steering gear.

* * * * *